US008788592B1

(12) United States Patent
Mutreja

(10) Patent No.: US 8,788,592 B1
(45) Date of Patent: Jul. 22, 2014

(54) SYSTEM AND METHOD FOR CUSTOMIZABLE E-MAIL MESSAGE NOTES

(75) Inventor: Tanu Mutreja, Utter Pradesh (IN)

(73) Assignee: Oracle America, Inc., Redwood City, CA (US)

(*) Notice: Subject to any disclaimer, the term of this patent is extended or adjusted under 35 U.S.C. 154(b) by 1985 days.

(21) Appl. No.: 10/824,735

(22) Filed: Apr. 15, 2004

(51) Int. Cl.
*G06F 15/16* (2006.01)
(52) U.S. Cl.
USPC .......................................................... 709/206
(58) Field of Classification Search
USPC ................................................ 709/204–206
See application file for complete search history.

(56) References Cited

U.S. PATENT DOCUMENTS

| | | | | |
|---|---|---|---|---|
| 6,510,453 | B1 * | 1/2003 | Apfel et al. | 709/206 |
| 6,571,295 | B1 * | 5/2003 | Sidana | 709/246 |
| 6,640,242 | B1 * | 10/2003 | O'Neal et al. | 709/206 |
| 6,816,703 | B1 * | 11/2004 | Wood et al. | 455/3.04 |
| 6,823,325 | B1 * | 11/2004 | Davies et al. | 706/50 |
| 6,925,605 | B2 | 8/2005 | Bates et al. | |
| 6,941,304 | B2 * | 9/2005 | Gainey et al. | 707/10 |
| 7,149,788 | B1 * | 12/2006 | Gundla et al. | 709/218 |
| 7,155,419 | B2 * | 12/2006 | Blackman et al. | 705/80 |
| 7,290,036 | B2 * | 10/2007 | Cao et al. | 709/207 |
| 2002/0087678 | A1 * | 7/2002 | Padilla | 709/223 |
| 2002/0143828 | A1 * | 10/2002 | Montero et al. | 707/533 |
| 2002/0143871 | A1 * | 10/2002 | Meyer et al. | 709/204 |
| 2002/0156852 | A1 * | 10/2002 | Hughes et al. | 709/206 |
| 2002/0187794 | A1 * | 12/2002 | Fostick et al. | 455/466 |
| 2003/0065724 | A1 | 4/2003 | Clark | |
| 2003/0157968 | A1 * | 8/2003 | Boman et al. | 455/563 |
| 2003/0200272 | A1 * | 10/2003 | Campise et al. | 709/206 |
| 2003/0204567 | A1 * | 10/2003 | Martino et al. | 709/206 |
| 2003/0233336 | A1 * | 12/2003 | Clark | 707/1 |
| 2004/0078447 | A1 * | 4/2004 | Malik et al. | 709/206 |
| 2004/0080534 | A1 * | 4/2004 | Quach | 345/751 |
| 2004/0096043 | A1 * | 5/2004 | Timmins et al. | 379/88.22 |
| 2004/0158587 | A1 * | 8/2004 | Shay et al. | 707/201 |
| 2004/0181587 | A1 * | 9/2004 | Cao et al. | 709/206 |
| 2004/0230572 | A1 * | 11/2004 | Omoigui | 707/3 |
| 2004/0235520 | A1 * | 11/2004 | Cadiz et al. | 455/557 |
| 2004/0250201 | A1 * | 12/2004 | Caspi | 715/512 |
| 2005/0066005 | A1 * | 3/2005 | Paul | 709/206 |
| 2005/0080861 | A1 * | 4/2005 | Daniell et al. | 709/206 |
| 2005/0132010 | A1 * | 6/2005 | Muller | 709/206 |
| 2005/0160145 | A1 * | 7/2005 | Gruen et al. | 709/206 |
| 2008/0235344 | A1 * | 9/2008 | Paul | 709/206 |

OTHER PUBLICATIONS

Rex Baldazo, "Mozilla 1.0," http://www.zdnet.co.uk, Apr. 29, 2002, (2 Pages).
http://web.archive.org/web/20020217064808/http://www.pocomail.com/poco/help/viewing.html, Feb. 17, 2002, 2 pages.
Jonathan B. Postel, "Simple Mail Transfer Protocol," Information Sciences Institute, Aug. 1982, 68 pages.

* cited by examiner

*Primary Examiner* — Sulaiman Nooristany
(74) *Attorney, Agent, or Firm* — Robert C. Kowert; Meyertons, Hood, Kivlin, Kowert & Goetzel, P.C.

(57) ABSTRACT

A method and system for e-mail message user notes. E-mail servers may attach and store user notes with e-mail messages. An e-mail server may store user notes as part of user-profiles. Servers may provide notes to e-mail clients as e-mail header fields in e-mail messages and may generate custom header field names from user input. E-mail servers may associate notes with messages only when communicating with a specific e-mail client or may provide different notes for different e-mail clients. E-mail servers may provide custom views including user notes to web browser based e-mail clients. E-mail clients may allow users to specify a set of predefined notes from which specific notes may later be attached to e-mail messages.

66 Claims, 11 Drawing Sheets

| User Notes: | Sender: | Subject: |
|---|---|---|
| Do Not Delete | HR_Mgr@company.com | List of Company Holidays |
|  | John@company.com | Re: Re: First Draft of Document |
| Online Auction Results | Jane_Doe@some_isp.com | You've Won! |
| Tim's Comments | Tim@company.com | Re: First Draft of Document |
|  | Sara@company.com | Re: First Draft of Document |
| Do Not Delete | HR_Mgr@company.com | Change Company Policy |
| Tim's Comments | Tom@company.com | Re: First Draft of Document |
|  | John_Doe@client.com | Project Status |
| Online Auction Results | Jane_Doe@some_isp.com | You've been outbid. |
| Tim's Comments | Ted@company.com | Re: First Draft of Document |
| Add to Filter List | noone@nowhere.com | [Suspected Spam] Make More Money! |

| User Notes: | Sender: | Subject: |
|---|---|---|
| Tim's Comments | Tim@company.com | Re: First Draft of Document |
| Tim's Comments | Tom@company.com | Re: First Draft of Document |
| Tim's Comments | Ted@company.com | Re: First Draft of Document |
| Online Auction Results | Jane_Doe@some_isp.com | You've Won! |
| Online Auction Results | Jane_Doe@some_isp.com | You've been outbid. |
| Do Not Delete | HR_Mgr@company.com | List of Company Holidays |
| Do Not Delete | HR_Mgr@company.com | Change Company Policy |
| Add to Filter List | noone@nowhere.com | [Suspected Spam] Make More Money! |
| | John@company.com | Re: Re: First Draft of Document |
| | | |
| | | |

*FIG. 8B*

| User Notes: | Sender: | Subject: |
|---|---|---|
| Tim's Comments | Tim@company.com | Re: First Draft of Document |
| Tim's Comments | Tom@company.com | Re: First Draft of Document |
| Tim's Comments | Ted@company.com | Re: First Draft of Document |
| | | |
| | | |
| | | |
| | | |
| | | |
| | | |

SYSTEM AND METHOD FOR CUSTOMIZABLE E-MAIL MESSAGE NOTES

BACKGROUND OF THE INVENTION

1. Field of the Invention

This invention relates to computer systems generally, and more particularly to the field of electronic messaging.

2. Description of Related Art

E-mail client programs generally fall into two categories. A thin client is a piece of software that is designed to be very small, and therefore relies upon a server to perform most system functions and data processing. A typical thin e-mail client therefore relies upon an e-mail server to manage most of the processing associated with e-mail messages.

Web browser based e-mail clients are generally thin clients. With each program session these clients may download and display the headers for the current set of messages stored on the server. The user can then use the information displayed about the sender, received date, subject and other data to choose which e-mail messages to view. Once the user has requested to view the body of a specific message, the thin client may download the full message content from the server. In general, thin clients do not store the actual messages contents beyond the current program session. The e-mail server will generally provide the actual user view of e-mail messages to thin client by sending web pages built in "on the fly".

Other clients, sometimes called thick clients, may periodically download every message in its entirety. This allows users to view messages when not connected to the e-mail server. These clients typically do not rely upon the server to provide any statistics about e-mail messages other than informing the client about new messages that can be downloaded.

Managing the standard inbox and keeping track of which e-mail messages have not been read, those that have been read, those that require responses and that those that have already been answered may be part of a user's daily routine. E-mail clients generally provide some aids for sorting or searching e-mail messages using information from or about the message including the sender's name, the sender's e-mail address, the subject, the date received, etc. Returning to a specific e-mail in order to re-read and/or respond can be difficult, especially if that e-mail is just one among many with the same or similar subjects or other e-mail headers. This situation can occur when two or more people take part in an extended e-mail conversation. The resulting e-mail "thread" consists of many messages differing only by the number of "Re:" or "Fwd:" directives prefixed to each message's subject. Other e-mail message headers, like the sent or received dates, may not provide enough additional information to ease the locating of a particular e-mail message, When responding to an e-mail message, e-mail client programs may also include the entire contents of the original messages in the body of the response message.

To find a specific message from among all the messages of a specific thread, the recipient generally has to successively open and scan the contents of each message in the thread.

E-mail client programs provide various levels of functionality with regards to handling e-mails. Most client programs give the user the ability to search for messages. When searching for one specific message from among the many messages in an e-mail thread, this results in multiple "hits" due to the inclusion of previous e-mail contents in reply messages.

SUMMARY

A system and method for customizable e-mail message notes is disclosed. An e-mail client may allow a user to associate a note with an e-mail message. E-mail clients may allow users to specify a set of predefined notes from which specific notes may later be selected for associating with e-mail messages. E-mail clients may send user notes to an e-mail server for storage. E-mail servers may associate and store user notes with e-mail messages. A server may store user notes as e-mail header fields or as part of user-profiles. Clients or servers may generate custom header field names from user input and may store multiple user notes as header fields of a single e-mail message. Servers may provide user notes for e-mail messages only when communicating with a specific e-mail client or servers may provide different notes for different e-mail clients. E-mail servers may provide custom views including user notes to web browser based e-mail clients. A server may automatically associate notes with an e-mail message based upon user preferences or based upon information in or about the message. Clients may display notes with other information about e-mail messages or may display notes separately from e-mail messages.

BRIEF DESCRIPTION OF THE DRAWINGS

FIG. 8A illustrates an embodiment of a method for displaying e-mail messages and their associated user notes according to one embodiment.

FIG. 8B illustrates an embodiment of a method for sorting of e-mail messages by their associated user notes according to one embodiment.

FIG. 8C illustrates an embodiment of a method for filtering of e-mail messages by their associated user notes.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
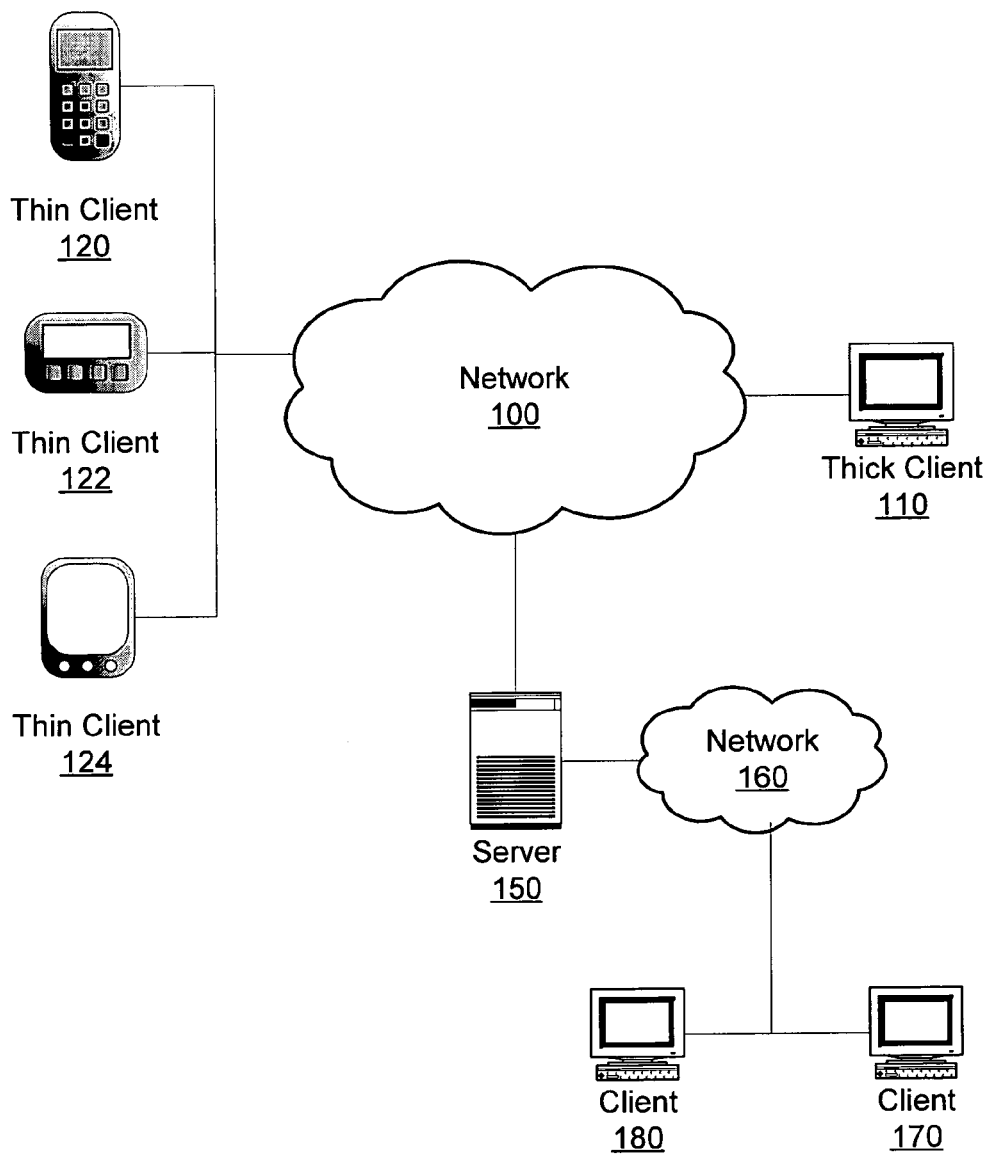
FIG. 1 illustrates networked computer systems capable of associating user notes with e-mail messages, according to one embodiment.

FIG. 1 illustrates a computer network, according to one embodiment, on which one or more devices may be configured to implement customizable e-mail message notes. In this embodiment, at least one computing device on Network 100 or Network 160 may be an e-mail client, such as Thin Client 120, Thin Client 122, Thin Client 124, Thick Client 110, Client 170 or Client 180, and may include software configured to send and/or receive e-mail messages and user notes. E-mail clients may, according to certain embodiments allow users to create and associate custom, user notes with e-mail messages. E-mail clients, such as Thin Client 120, may associate user notes with received or sent e-mail messages and may utilize user notes to help a recipient organize both sent and received e-mail messages, according to various embodiments. In one embodiment, user notes, may be created and associated with e-mail messages at any time, or at multiple times, during the life of an e-mail message.

E-mail clients may, according to certain embodiments, be configured to allow a user to modify or change the contents of an associated user note. E-mail client may allow a user to modify the contents of a user note associated with a received e-mail message. Additionally, e-mail clients, such as Thin Client 120, or Client 170 may be configured to allow a user to delete user notes associated with e-mail messages. Alternately, e-mail clients may be configured, in some embodiments to allow a user to remove the association between a user note and a particular e-mail message. According to one embodiment, Client 170 or 180 may be configured to allow a user to create a set of predefined notes from which specific notes that may be selected for attachment to individual e-mail messages.

It should be noted that user notes are distinct from the subject field of e-mail messages, which generally may only be edited only when sending an e-mail message, either originally, or when resending the e-mail message, such as when replying or forwarding. According to some embodiments, user notes may be associated with received e-mail messages without resending the received e-mail message.

According to some embodiments, an e-mail client, such as Thin Client 120, Thin Client 122, Thin Client 124, Thick Client 110, Client 170 or Client 180, may display a user note along with other information about an e-mail message. In one embodiment, Client 170 may display a user note as part of information displayed as a summary list of received e-mail messages. In other embodiments, Client 170 may be configured to display a custom notes in response to some user action, such as moving or hovering a mouse, or other pointing device, over the e-mail message in such a summary listing. In yet other embodiments, Client 170 may be configured to allow a user to modify the contents of a user notes in a summary list, or to identify a user note to be modified from such a summary list. In some embodiments, Client 170 may be configured to allow a user to delete a user note, or otherwise remove the association between a user note and a particular e-mail message from a summary listing.

An e-mail client may provide a user note to an e-mail server and identify the e-mail message with which to associate the user note. In one embodiment, an e-mail client, such as Clients 170 or 180, may associate user notes with e-mail messages by adding them as custom e-mail header fields. For example, Client 170 may use a standard e-mail header field name, such as "recipient-notes" to identify the user note header field, while in other embodiments Client 170 may be configured to allow a user to define a custom header field name with which to identify the user note. Client 170 may be configured to allow a user to define multiple custom header fieldnames, each identifying a separate user note, for a single e-mail message.

In one embodiment, at least one computing device on Network 100 or Network 160 may be an e-mail server device, such as Server 150, that may include software configured to receive, store, maintain, and/or forward e-mail messages. In certain embodiments, Server 150 may be configured to store and provide custom notes associated with e-mail messages. In yet other embodiments, Server 150 may store these notes and provide them to e-mail clients, such as Client 170 or Client 180. Server 150 may store a user note separately from its associated e-mail message or it may store notes as a header fields of the associated e-mail messages, according to various embodiments.

In one embodiment, Server 150 may add a user note as a header field in future e-mail sessions with e-mail clients. In some embodiments, more than one note may be associated with a single e-mail message. An e-mail server, such as Server 150, may automatically associate notes with an e-mail message based upon user preferences or based upon information in or about the message. According to such an embodiment, an e-mail client may use both standard and custom header field names to store different e-mail message notes. In other embodiments, one single user note may be associated with multiple e-mail messages. According to one embodiment, a thin, or web browser based, e-mail client may generate and associate user notes with e-mail messages, while allowing an e-mail server to store and supply the notes when e-mail messages are viewed in the future. An e-mail client also may provide modified user notes to an e-mail server, in certain embodiments. In other embodiments, a web browser based e-mail client may modify or delete the user notes associated with e-mail messages or may instruct an e-mail server to modify or delete the user notes.

In some embodiments, Thin Client 120 may retrieve the header fields of an e-mail message prior to retrieving the entire message contents and may thereby retrieve a user note associated with that e-mail message. Web browser based e-mail clients and thin clients, such as Thin Clients 120, 122, and 124, may, with each program session, download and display the headers for the current set of e-mail messages stored on the server. According to one embodiment, thin clients may download and display any custom notes associated with the current set of e-mail messages stored on the server. Thin Clients 120, 122, and 124 may allow a user to use the displayed custom notes to choose which e-mail messages to view, according to one embodiment. Once the user has requested to view the body of, or has "opened" a specific e-mail message, the thin client may download the full message content from the server. Thin Clients 120, 122, and 124 may not store the user notes or the actual message contents beyond the current program session, according to some embodiments.

In other embodiments, Server 150 may supply a user note separately from an e-mail message while still identifying the e-mail message with which the user note is associated. In such an embodiment, an e-mail client, such as Think Clients 120, 122, and 124 may display the custom note to a user in such a manner that the user cannot tell whether the user note was supplied as part of the e-mail message or provided separately.

In one embodiment, a user's custom notes may be stored as part of that user's profile on Server 150. Email servers may provide user notes only when a specific e-mail client is used to retrieve or view e-mail messages. For example, in one embodiment, Server 150 may provide custom notes only when a user is retrieving e-mail messages using SunONE Messenger Express™. In such an embodiment, Server 150 may not provide user notes when a user to retrieving e-mail messages using Microsoft Outlook™.

In other embodiments, Server 150 may provide user notes to any e-mail client regardless of the specific e-mail client software is used to retrieve or view e-mail messages. In yet other embodiments, Server 150 may be configured to provide different notes to different e-mail clients. For instance, in one embodiment, Server 150 may be configured to provide one set of short, abbreviated user notes when a user views e-mail messages using a web browser based e-mail client, such as Thin Client 120. Yet in another embodiment, Server 150 may provide a different set of longer, more detailed user notes when the same user views those same e-mail messages using Thick Client 110, which may be a more capable device, such as an personal computer.

In certain embodiments, Server 150 may be configured to provide custom web pages including user notes to a web browser based e-mail clients, such as Thin Clients 120, 122, and 124, possibly including different user notes to each thin client depending upon the specific web browser software each thin client is running.

In some embodiments, e-mail clients may provide the ability to search for an e-mail message based upon the presence of a specific user note. According to certain embodiments, an e-mail client may be configured to sort or filter e-mail messages based upon their attached notes. In one embodiment, an e-mail server may provide custom web pages to allow a web browser based e-mail client to search for user notes or to display sorted and filtered e-mail messages to a user. In other embodiments, an e-mail server may provide custom web pages to allow web browser based e-mail client to modify or delete user notes.

In certain embodiments, e-mail clients may allow users to modify the contents of user notes. In one such embodiment, an e-mail client may allow a user to modify the contents of a user note that is associated with more than one e-mail message. When modifying the contents of a user notes associated with more than one e-mail message, an e-mail client may allow the user to modify the user note contents for some of the associated e-mail while leaving the original contents of the user note for other associated e-mail message by associating a new user note generated with the modified contents and associating it with the appropriate e-mail messages. In one embodiment, user notes associated with e-mail messages may be modified at any time, or at multiple times, during the life of an e-mail message. For example, a user may initially associate a user note describing the status of a project referenced in a received e-mail message and later update the contents of that user note as the project status changes.

An e-mail client device, such as Thin Client 120, Thin Client 122, Thin Client 124, Thick Client 110, Client 170 or Client 180 illustrated in FIG. 1 and described above, may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat capable of executing e-mail processing software. Such e-mail processing may include, but is not limited to, creating, sending, receiving, storing, modifying, deleting or displaying e-mail messages, e-mail addresses, or other information about e-mail messages or e-mail message communication. Additionally, such a client device may be configured to generate and associate user notes with e-mail messages. One or more client devices illustrated in FIG. 1 and listed above, may be thin or web browser based e-mail clients, according to certain embodiments.

Network 100 or Network 160 may comprise any network technology in various embodiments. Network 100 or Network 160 may be a local area network, wide area network, intranet network, Internet network, or any other type of network. Network 100 or Network 160 may be designed to be continuously available (although network outages may occur), or may be intermittent (e.g. a modem connection made between a computer system in a user's home and a computer system in a user's workplace).

Networks 100 and 160 may utilize any of a number of different physical networking technologies including, but not limited to, Fiber Channel, Ethernet, Fast-Ethernet, Gigabit-Ethernet, Myrinet, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Networks 100 or 160 may comprise shared storage or shared memory for communicating between different computer systems or between processes within the same computer system, in some embodiments.

E-mail client devices, such as Thin Client 120, Thin Client 122, Thin Client 124, Thick Client 110, Client 170 or Client 180, may be configured to couple over Network 100 or Network 160 to one or more other devices via one or more wired or wireless network interfaces and may be configured to exchange e-mail messages or information about e-mail messages according to one or more networking or messaging protocols such as IP, TCP, TCP/IP, UDP, ICMP, FTP, TEL-NET, POP, POP2, POP3, IMAP2, IMAP2bis, IMAP3, IMAP4, IMAP4rev1, ACAP, DMSP, PCMAIL, SMTP, ESMTP, MIME or PEM. The foregoing list of networking and messages protocols is intended to be exemplary only, and is not intended be limiting in any way. E-mail client devices may be configured to communicate using other network or messaging protocols apart from those listed.

An e-mail server device, such as Server 150 illustrated in FIG. 1, may be any of various types of devices, including, but not limited to, a personal computer system, desktop computer, laptop or notebook computer, mainframe computer system, workstation, network computer, or in general any type of networkable computing device with a digital heartbeat capable of provide e-mail processing services. Server 150 may be configured to couple over Network 100 or Network 160 to one or more other devices via one or more wired or wireless network interfaces and may be configured to exchange e-mail messages or information about e-mail messages according to one or more networking or messaging protocols such as IP, TCP, TCP/IP, UDP, ICMP, FTP, TELNET, POP, POP2, POP3, IMAP2, IMAP2bis, IMAP3, IMAP4, IMAP4rev1, ACAP, DMSP, PCMAIL, SMTP, ESMTP, MIME or PEM.

In certain embodiments, Server 150 may be coupled to two different networks, such as both Network 100 and Network 160 in FIG. 1. For instance, a company's e-mail server may be connected to both the Internet as well as to the company's local Ethernet network. According to such an embodiment, Server 150 may provide e-mail processing services, possible including custom e-mail message notes, to Client 170 and Client 180 across Network 160, as well as transmit e-mail messages across Network 100, to Thin Client 120, Thin Client 122, Thin Client 124, and Thick Client 110. The foregoing list of networking and messages protocols is intended to be exemplary only, and is not intended be limiting in any way. E-mail servers, such as Server 150, may be configured to communicate using other network or messaging protocols apart from those listed.

Figure 2A:
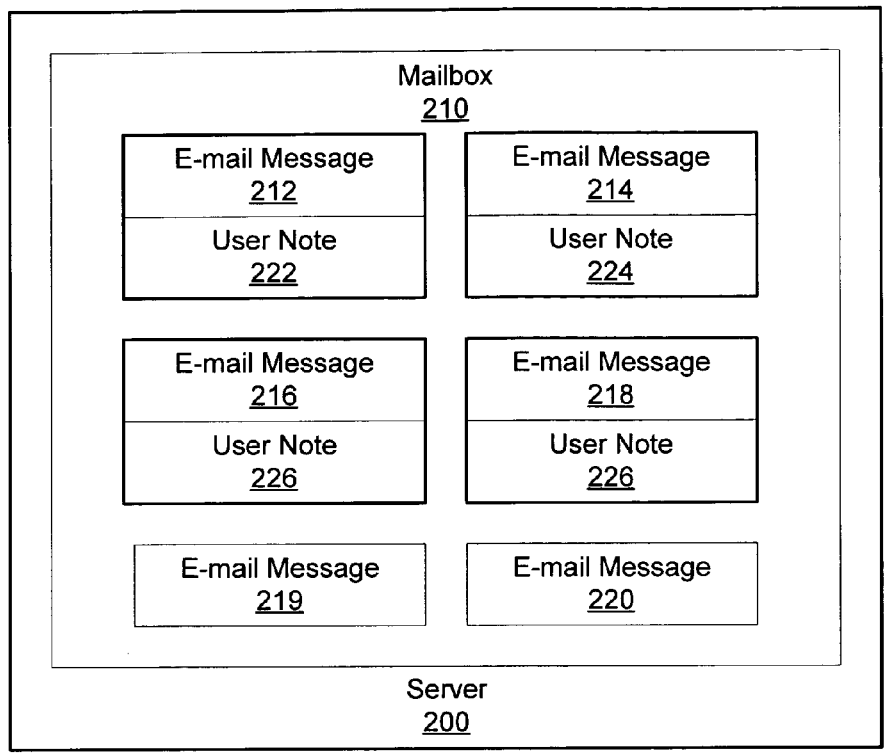
FIG. 2A is a block diagram illustrating a server storing associated user notes with e-mail messages, according to one embodiment.
Figure 2B:
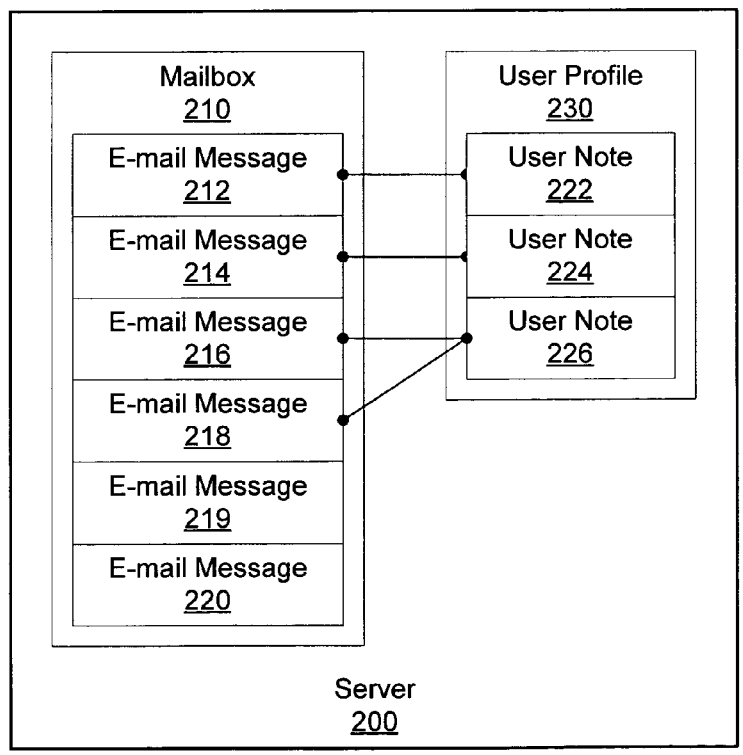
FIG. 2B is a block diagram illustrating a server associating user notes with e-mail messages stored in a user profile, according to one embodiment.

FIGS. 2A and 2B illustrate, according to different embodiments, methods for an e-mail server to store user notes associated with e-mail messages. FIG. 2A illustrates, according to some embodiments, an e-mail server storing user notes together with, or as a part of, the e-mail messages with which they are associated. FIG. 2B, illustrates, according to other embodiments, an e-mail server storing user notes as part of a user profile.

As shown in FIG. 2A, according to one embodiment, Server 200 may store e-mail messages for a particular user in Mailbox 210. In such an embodiment, Server 200 may store user notes as part of their associated e-mail messages in MailBox 210. For example, Server 200 may, according to certain embodiments, create new header fields for e-mail messages with associated user notes and store those user notes in those header fields. In another example, according to a different embodiment, Server 200 may store user notes as attachments to e-mail messages.

In one illustrative example, according to one embodiment, Server 200 may store six e-mail messages, four of which are associated with user notes. In such an example, E-mail Message 212 may be associated with User Note 222, while E-mail Message 214 may be associated with User Note 224. Server 200 may be configured to associate both E-mail Message 216 and E-mail Message 218 with User Note 226, according to one embodiment. In such an embodiment, Server 200 may store the associated user note as part of the e-mail message, as illustrated by FIG. 2A, and therefore may keep two copies of User Note 226, one with each of the two e-mail message associated with User Note 226. Server 200 also may also store e-mail messages that are not associated with any user notes, such as E-mail Message 219 and E-mail Message 220, in Mailbox 200.

As illustrated in FIG. 2B, according to some embodiments, Server 200 may store the same six e-mail messages described above for FIG. 2A in MailBox 210 for a particular user and may store that user's preferences and other information in User Profile 230. In certain embodiments, Server 200 may link the user notes stored in User Profile 230 with the appropriate e-mail messages in MailBox 210 in various ways. For example, according to one embodiment, Server 200 may store an ID referencing an e-mail message along with a user note in User Profile 230. In another example, according to different embodiment, Server 200 may store IDs representing both e-mail messages and their associated user notes in a separate table within User Profile 230, MailBox 210, or elsewhere in Server 200.

Using the same associations described above for the embodiments illustrated in FIG. 2A, Server 200 may, according to one embodiment, associate E-mail Message 222 with User Note 224 and E-mail Message 214 with User Note 224. Again similar to the embodiments illustrated by FIG. 2A, Server 200 may associate both E-mail Message 216 and E-mail Message 218 with User Note 236, according to one embodiment. Once again, Server 200 may store E-mail Messages 219 and 220 in MailBox 210 even though they may not be associated with any user notes stored in User Profile 230.

Figure 3A:
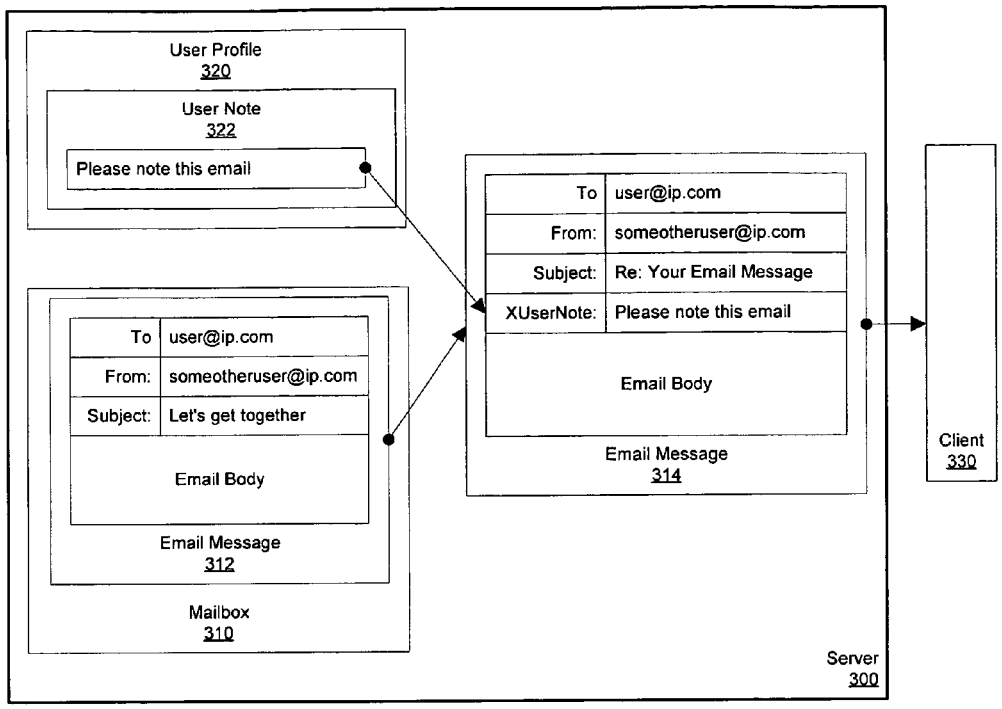
FIG. 3A is a block diagram illustrating, according to one embodiment, a server including a user note as an e-mail message header.
Figure 3B:
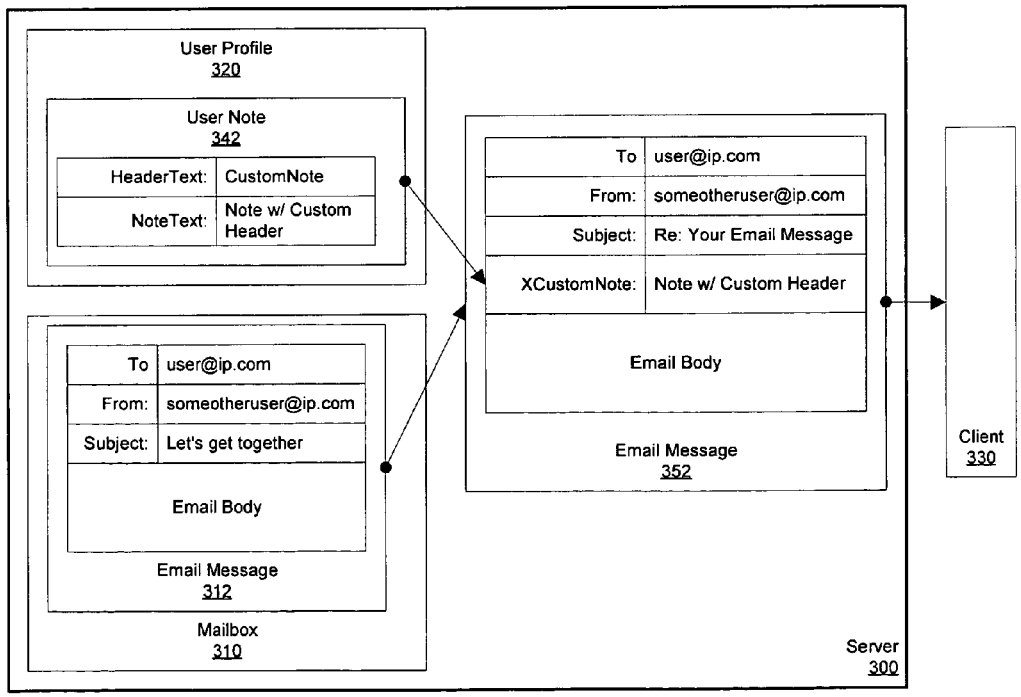
FIG. 3B is a block diagram illustrating, according to one embodiment, a server including a user note as an e-mail message header using a custom header field name.
Figure 3C:
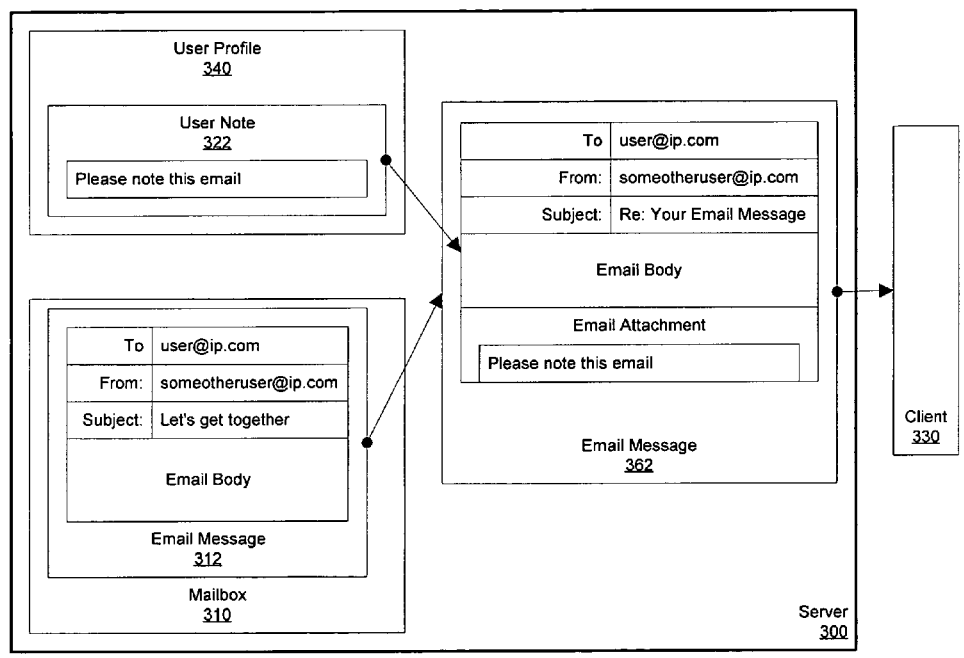
FIG. 3C is a block diagram illustrating, according to one embodiment, a server including a user note as an e-mail message attachment.

FIGS. 3A, 3B, and 3C illustrate, according to various embodiments, methods for an e-mail server to provide e-mail clients with user notes.

FIG. 3A illustrates a method, according to one embodiment, whereby an e-mail server, such as Server 300, may provide a user note as part of an e-mail message delivered to Client 330. In one embodiment, Server 300 may combine Email Message 312, stored in Mailbox 310, with User Note 322, stored in User Profile 320, to create E-mail Message 314. For example, according to one embodiment, Server 300 may combine E-mail Message 312 with User Note 322 by adding an additional "XUserNote" header field, whose value is the contents of User Note 322, to E-mail Message 314.

FIG. 3B illustrates another method, according to a different embodiment, whereby Server 300 may provide a user note as part of an e-mail message delivered to Client 330. In this embodiment, Server 300 may combine Email Message 312, stored in Mailbox 310, with User Note 342, stored in User Profile 320, to create E-mail Message 352. Unlike the embodiment discussed regarding FIG. 3A above, in the embodiment illustrated by FIG. 3B, Server 300 may use a custom header field name, stored as part of User Note 342 to create a header field in E-mail Message 352. For instance, as shown in FIG. 3B, Server 300 may create a header field named "XCustomNote" and use the contents of User note 342 as the value of the XCustomNote header, according to one embodiment.

In another example, Server 300 may allow a user to specify the custom header field name to use when including a user note with an e-mail message. In such an embodiment, Server 300 may add additional characters to user input when creating a custom header field name. For example, a user may specify the text "UrgentNote" as a custom header field name and Server 300 may include the text "XNote" with the user specified text and therefore use "XNote-UrgentNote" as the actual header field name. Using such a method according to certain embodiments and illustrated in FIG. 3B, Server 300 may associate multiple user notes with the same e-mail message, all as different header fields using different user specified header names. In other embodiments, Server 300 may associated multiple user notes with a single e-mail message by automatically generating a unique header field name for each user note.

FIG. 3C illustrates a method, according to certain embodiments, whereby Server 300 may provide a user note as an attachment to an e-mail message delivered to Client 330. In this embodiment, Server 300 may combine Email Message 312, stored in Mailbox 310, with User Note 322, stored in User Profile 320, to create E-mail Message 362. Unlike the embodiments discussed regarding FIGS. 3A and 3B above, in embodiments illustrated by FIG. 3C, Server 300 may use an e-mail attachment to associate User Note 322 with E-mail Message 312. Using such a method according to certain embodiments and illustrated in FIG. 3C, Server 300 may associate multiple user notes with the same e-mail message by utilizing multiple e-mail attachments, one for each user note. Alternatively, according to other embodiments, Server 300 may include multiple user notes in a single e-mail attachment by including a delimiter, or by providing a table of offsets and lengths, thus identifying each separate user note in the attachment.

Figure 4A:
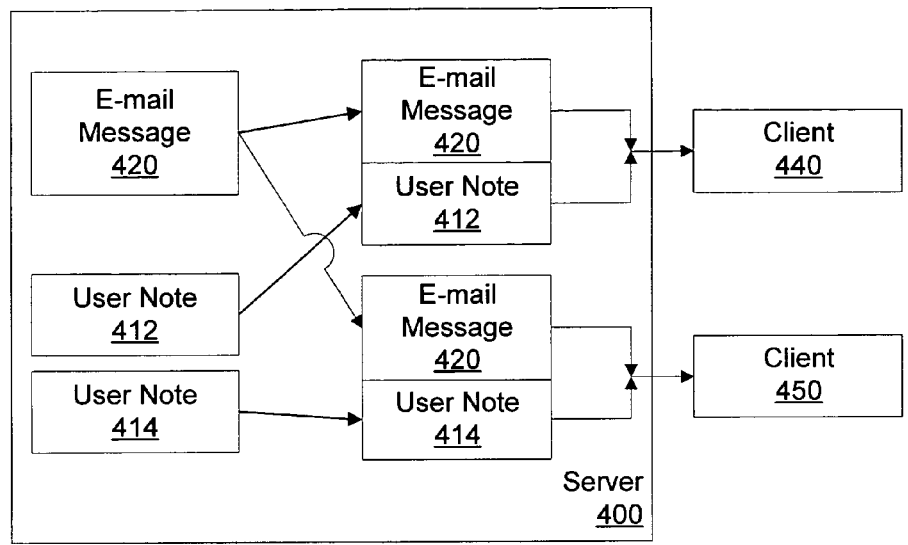
FIG. 4A is a block diagram illustrating one embodiment of a server providing different user notes to different e-mail clients.

FIG. 4A illustrates, according to one embodiment, a method for an e-mail server to associate different user notes with an e-mail message based upon the e-mail client used to retrieve the message. For example, a user may configure his e-mail server to associate a different user note with a certain e-mail message when viewing that e-mail message from a different e-mail client. For example, a user may wish to view shorter user notes from a web-based, thin e-mail client in order to save download time, while still being able to view longer, more detailed user notes when downloads are faster. As shown in FIG. 4A and according to one embodiment, Server 400 may store one e-mail message, E-mail Message 420, while storing two user notes, User Note 412, and User Note 414. Additionally, Server 400 may be configured to provide E-mail Message 420 to both Client 440 and Client 450. According to such an embodiment, Server 400 may be configured to associate User Note 412 with E-mail Message 420 when providing E-mail Message 420 to Client 440, and associate User Note 414 with E-mail Message 420 when providing E-mail Message 420 to Client 450. Hence, a single e-mail message may be associated with different user notes based upon the nature of the e-mail client retrieving or viewing the e-mail message.

Figure 4B:
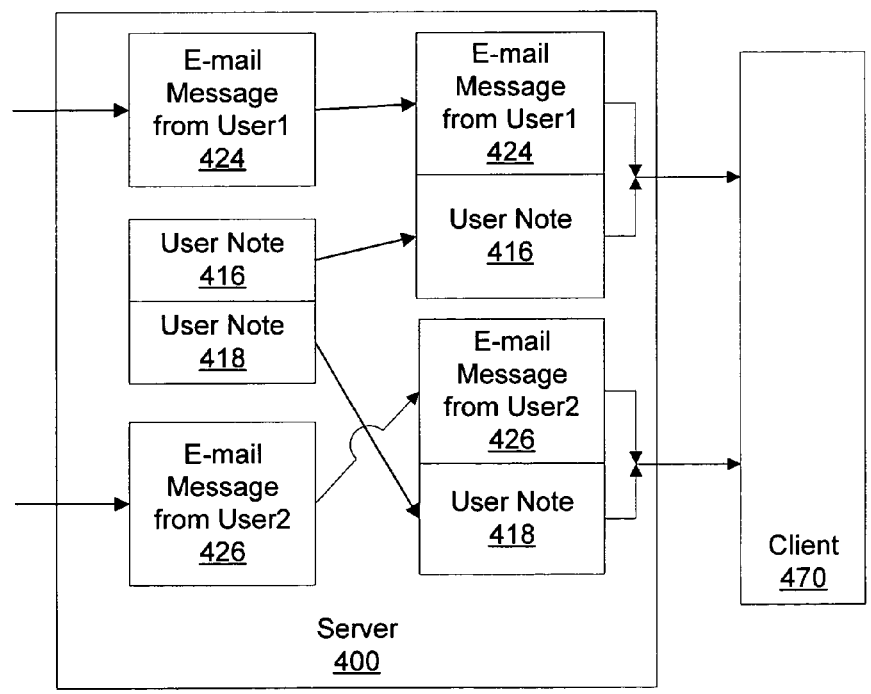
FIG. 4B illustrates one embodiment of a server associating user notes with e-mail messages depending upon information about the e-mail messages.

FIG. 4B illustrates, according to certain embodiments, a method for an e-mail server to associate different user notes with an e-mail message based upon information in or about the e-mail message. As discussed above, a user may, in certain embodiments, create a set of predefined user notes to be associated with e-mail messages. According to one embodiment illustrated by FIG. 4B, a user may wish to have different predefined user note associated with e-mails from different e-mail addresses. For example, a user may send out an email requesting comments on a recent presentation. Since, in such an example, all replies to the user's e-mail message may have the same subject, for instance, "Re: Request for Comments," the user may wish to associate a specific user note with e-mail messages from a particularly helpful person, thereby making it easier to find that person's comments when they arrive. Alternatively, the user may wish to use a different user note to mark e-mail messages from a prolific, yet unhelpful, person. Following the example above, and as shown in FIG. 4B, Server 400 may associate User Note 416 with E-mail Message 424 from User1, and may associate User Note 418 with E-mail Message 426 from User2, before providing the e-mail messages and associated user notes to Client 470.

Figure 5:
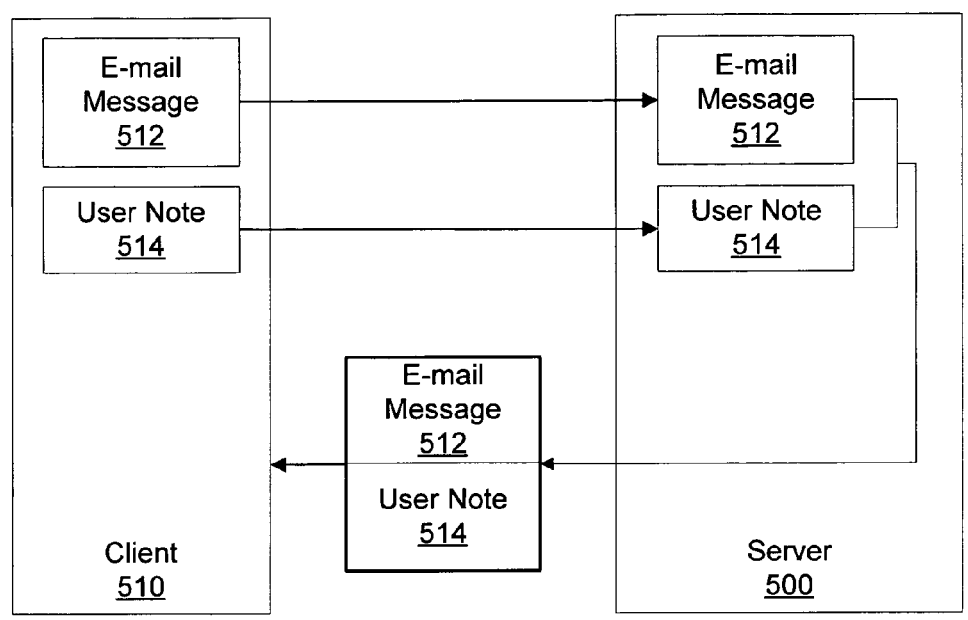
FIG. 5 is a block diagram illustrating, according to one embodiment, a method for an e-mail client to store associated user notes on an e-mail server.

FIG. 5 illustrates, according to one embodiment, a client associating a user note with an e-mail message, sending the e-mail message and the user note to an e-mail server and the e-mail server providing that e-mail message and the associated user note back to the client.

According to one embodiment, an e-mail client may associate a user note with an e-mail message, send the e-mail message and user note separately to an e-mail server, and have that e-mail server provide that e-mail message and associated user note back to the client. For instance, a user may use a thin, or web-browser based, e-mail client that may not be configured to store e-mail message and user notes locally, but must rely upon an e-mail server for such storage.

In one embodiment, Client 510 may provide the e-mail message and user note to Server 500 separately, while Server 500 may later provide the user note as a part of the e-mail message, as described above. In some embodiments, Client 510 may not actually transmit the entire e-mail message to Server 500, but may provide enough information to correctly identify the e-mail message for association with the user note.

As shown in FIG. 5, according to one embodiment, Client 510 may be configured to associate User Note 514 with E-mail Message 512 and send both E-mail Message 512 and User Note 514, including information regarding their association, to Server 500. According to such an embodiment, Client 510, may, at a later time, retrieve E-mail Message 512 from Server 500, and at such time, Server 500 may then provide E-mail Message 512 and associated User Note 514 to Client 510. Server 500 may provide E-mail Message 512 and User Note 514 to Client 501 in many ways, including, but not limited to, the methods described above.

Figure 6:
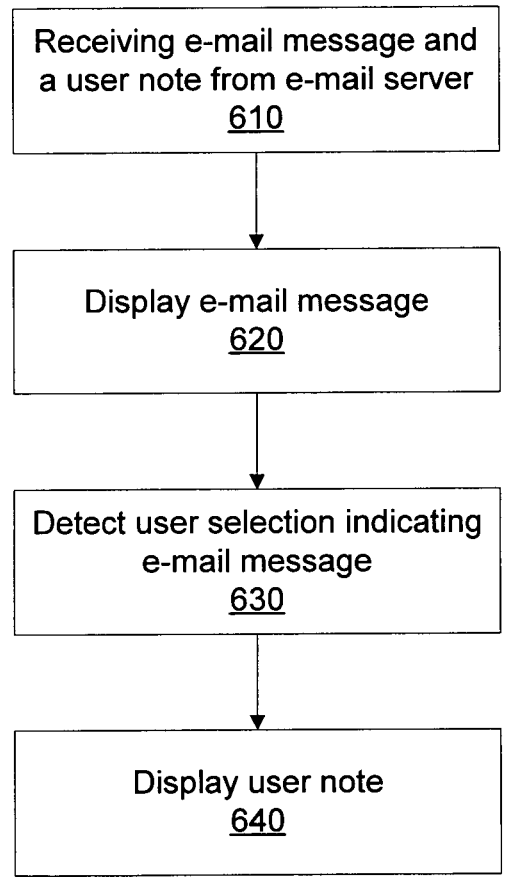
FIG. 6 is flow diagram illustrating one embodiment of a method for an e-mail client to display a user note.

FIG. 6 is a flowchart illustrating a method, according to one embodiment for a client to receive and display a user note associated with an e-mail message. According to such an embodiment, an e-mail client may receive an e-mail message and an associated user note from an e-mail server, as shown in block 610. The e-mail client may receive the e-mail message and associated note as result of the user selecting to view or open that e-mail message.

The e-mail client may then display the e-mail message, as shown in block 620. The e-mail client may display the message in various ways, according to different embodiments. For example, the client may display a summary listing of e-mail messages showing the sender, subject, date and time of the e-mail message. In one embodiment, such a summary listing may include the associated user note. In other embodiments, it may not. In one embodiment, The e-mail client may detect some user action selecting the e-mail message, as shown in block 630 and the client may, in response to such action, display the user note to the user, as shown in block 640. There are various ways for the user to perform a selection indicating the e-mail message and various ways for the e-mail client to display the user note. For example, in some embodiments, the user may select the e-mail message from a summary listing and choose a menu command to view the user note. The user may right click and choose such a menu command from a resulting pop-up menu. In other embodiments, hovering a mouse over the appropriate row in a summary listing may direct the e-mail client to display the user note. In one embodiment, the user may select the e-mail message and the e-mail client may display the user note. In some embodiments, the e-mail client may display the user note in a pop-up window, or according to one embodiment, the client may display the user note in a common user note display area and change which user note is displayed according to which specific e-mail message the user has selected.

Please note that the flow diagram in FIG. 6 is intended to illustrate just one example embodiment and that other embodiments may perform these actions in other sequential or parallel orders, with or without additional actions.

Figure 7:
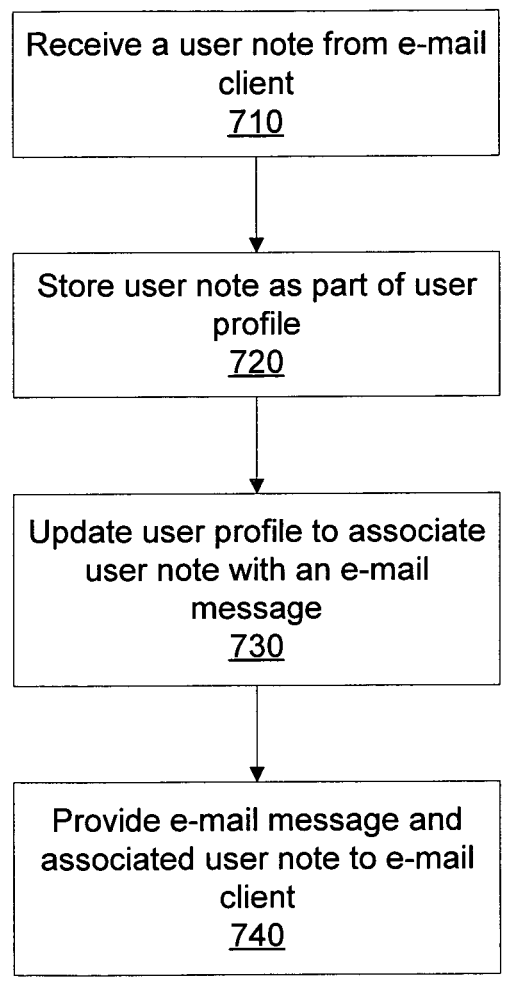
FIG. 7 is flow diagram illustrating one embodiment of a method for an e-mail server to associate a user note with an e-mail message.

FIG. 7 is a flowchart illustrating a method, according to one embodiment, for an e-mail server to associate a user note with an e-mail message. In one embodiment, an e-mail server, such as Server 150, may receive a user note from an e-mail client, such as Client 180, as illustrated by block 710. An e-mail server may, according to certain embodiments, store the user note as part of a user profile as illustrated by block 720. Additionally, an e-mail server may update the user profile to associate the user note with the e-mail message, as illustrated by block 730. In one embodiment, the e-mail server may receive information from an e-mail client about which e-mail message with which to associate the user note. For example, a user may select a particular e-mail message and associate it with a particular user note and the e-mail client may provide that information to the server. In another embodiment, an e-mail client may instruct the e-mail server to associate the user note with all e-mail messages from a particular sender, with e-mail message that contain a certain keyword in the subject.

The e-mail server may maintain user profiles for each e-mail account and may, along with other user preferences, maintain user notes and associations between user notes and e-mail messages. An e-mail server may store user notes and maintain the associations between user notes and e-mail messages in various ways according to different embodiments, as described above. In one embodiment an e-mail server may use unique ID numbers to associate user notes with e-mail messages, while in another embodiment, an e-mail server may use information from an e-mail message's header fields to associate a user note with that e-mail message. The e-mail server may provide the associated user note to the e-mail client, as illustrated by block 740.

According to one embodiment, the e-mail client may specify the association of a user note with an e-mail message, but may rely upon an e-mail server to store the user notes and maintain the association for later retrieval.

FIGS. 8A, 8B, and 8C illustrate, according to one embodiment, various ways of displaying user notes associated with e-mail messages to a user. In one embodiment, summary information for an e-mail message may be displayed in a grid row including the associated user note, the sender and the subject for the e-mail message. While FIGS. 8A, 8B, and 8C all illustrate summary information including user notes about e-mail messages using a grid, other embodiments may display user notes in different ways.

FIG. 8A illustrates a display, according to one embodiment, wherein a client may display a grid showing information about a list of e-mail messages and their associated user notes. In such an embodiment, each horizontal line in the grid may show information about one e-mail message. According to this embodiment, a client program may be configured to display the user notes associated with e-mail messages, as column 822 of grid 800 in FIG. 8A illustrates. A client may also use other columns to show who sent the e-mail message or display the subject of the e-mail message, as shown by columns 824 and 826, respectively. In other embodiments, the client may show more or different information about the e-mail in fewer or additional columns.

FIG. 8B illustrates a display conforming to one embodiment wherein a client may display a grid showing information about a list of e-mail messages sorted by their associated user notes. As in the embodiment discussed regarding FIG. 8A above, and according to one embodiment illustrated by FIG. 8B, each horizontal line in grid 800 may show information about an e-mail message and grid 800 may display several columns, each displaying a different piece of information from or about the e-mail message. Displaying user notes associated with e-mail messages may allow the user to decide in what order to read or respond to e-mail message or may allow the user to locate a particular e-mail message from among similar e-mail messages.

According to one embodiment, a client may sort the grid lines by the user notes associated with the e-mail messages. As discussed above, the same user note may be associated with more than one e-mail message. For example, a user may decide to associate a user note identifying the most relevant messages from a group of e-mail messages. As shown in FIG. 8B, sorting grid 800 by user notes may cause grid lines containing e-mail messages associated with the same user notes to be grouped together, according to one embodiment.

For example, in one embodiment, illustrated in FIG. 8B, grouping 812 may show three e-mail messages associated with a "Tim's Comments" user note, while grouping 814 may show two e-mail messages associated with a "Online Auction Results" user note, grouping 816 may show two e-mail messages associated with an "Do Note Delete" user note, grouping 818 may show one e-mail message associated with an "Add to Filter List" user note, and grouping 820 may show three e-mails that do not have associated user notes.

FIG. 8C illustrates a grid display, according to one embodiment, where an e-mail client may show information about e-mail messages filtered by their associated user notes. As with FIGS. 8A and 8B, an e-mail client may be configured to use column 822 of grid 800 to show the user note associated with each e-mail message and use columns 824 and 826 to show the sender and subject information of the e-mail message. As with the embodiment illustrated by FIG. 8B, discussed above, a client may use a grouping of lines within the grid to group e-mail messages associated with the same user note. For example, grouping 862 shows three e-mail messages associated with a "Tim's Comments" user note. An e-mail client, according to one embodiment, may filter the e-mail messages so that grid 800 may only show e-mail messages associated with the "Tim's Comments" user note.

Even though the embodiments discussed regarding FIGS. 8B and 8C refer to e-mail clients sorting and filtering e-mail messages according to user notes, in certain embodiments e-mail servers may perform this sorting or filtering on behalf of clients. This would be especially true in embodiments where a server may be providing these e-mail messages to a thin client that is not configured to perform these sorts and filters itself. According to other embodiments, however, thin e-mail clients may be configured to perform sorting or filtering of e-mail messages according to user notes. In some embodiments an e-mail client, either thick or thin, may be configured to re-sort or further filter e-mail messages according to user notes, even though a server may have already sorted or filtered those e-mail messages. For example, a server may have sorted a list of e-mail message by their associated user notes, but the client may then filter that list to only show e-mail messages associated with a specific user note.

Thus, as illustrated by FIGS. 8A, 8B, and 8C, according to various embodiments, e-mail clients and servers may sort, categorize, search or filter e-mail messages according to associated user notes.

Figure 9:
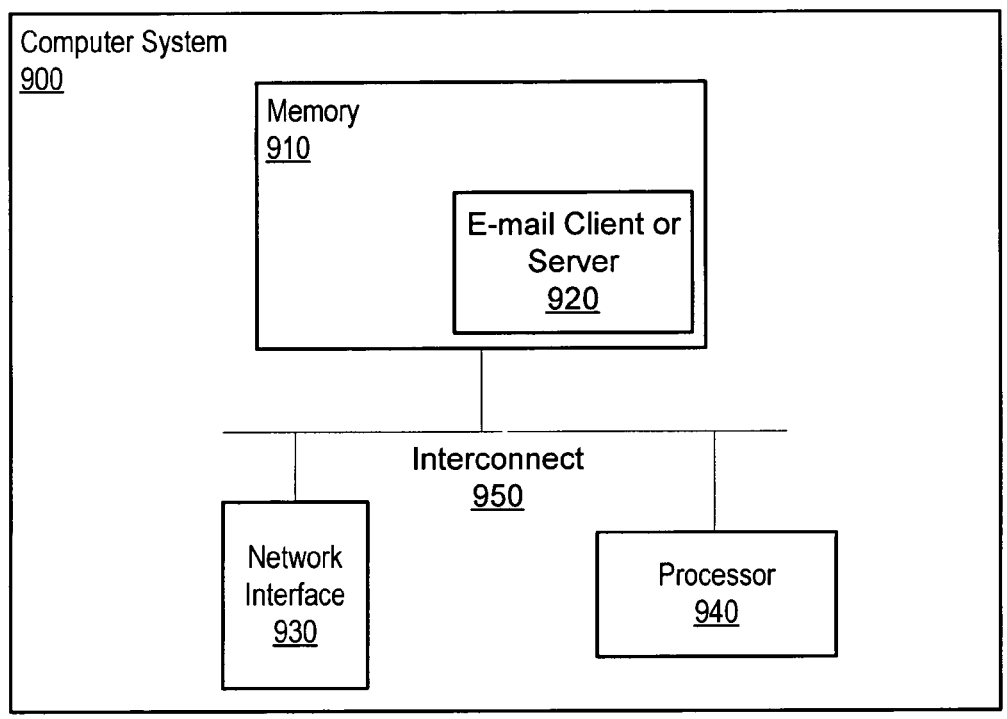
FIG. 9 is a block diagram illustrating, according to one embodiment a computer system that may be configured for e-mail message processing with user notes.

FIG. 9 illustrates a computing system in which e-mail messaging may be employed and which may be configured as any of the computer systems and devices described above and in which user notes may be associated with e-mail messages, according to various embodiments. Computer System 900 may be any of various types of devices, including, but not limited to, a personal computer system, desktop computer, laptop or notebook computer, mainframe computer system, handheld computer, workstation, network computer, a consumer device such as a mobile phone, pager, PDA, a smart appliance, or any type of networkable peripheral device such as storage devices, switches, modems, routers, etc, or in general any type of networkable computing device with a digital heartbeat with software installed and configured to associate user notes with e-mail messages. Computer system 900 may include at least one processor 940. The processor 940 may be coupled, across Interconnect 950 to Memory 910 and Network Interface 930. Network 930 may be any of various types of interfaces configured to couple with and communicate over Network 100 or Network 160 illustrated in FIG. 1 and described above.

Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. In some embodiments, Memory 910 may include program instructions configured to generate and associate user notes with e-mail messages. In one embodiment memory 910 may include program instructions configured to implement an e-mail client or server as shown in block 920. In such an embodiment, the e-mail client or server may include program instructions configured to generate user notes, associate user notes with e-mail messages, or send and receive e-mail messages with associated user notes.

Although the embodiments above have been described in considerable detail, numerous variations and modifications will become apparent once the above disclosure is fully appreciated. It is intended that the following claims be interpreted to embrace all such variations and modifications.

What is claimed is:

1. A method, comprising:
   receiving a note,
   wherein said note is a custom user note comprising user supplied text;
   receiving, by an e-mail server, note information,
   wherein said note information comprises information for identifying a received e-mail message with which to link, and
   wherein at the time said note information is received, said custom user note is not linked to said e-mail message;
   receiving, by said e-mail server, said e-mail message from a sender, wherein said e-mail message specifies said sender and specifies a recipient of said e-mail message, wherein said recipient is distinct from said sender;
   storing said custom user note on said receiving e-mail server;
   linking, by said receiving e-mail server, said custom user note with said e-mail message,
   wherein said custom user note and said e-mail message are linked based on said note information,
   wherein said linking comprises storing, by said receiving email server, information identifying said e-mail message and indicating that said e-mail message is linked with said custom user note; and
   subsequent to said receiving said e-mail message at said email server, supplying, by the receiving email server, both said e-mail message and said custom user note to an e-mail client for said recipient of said e-mail message,
   wherein said e-mail message and said custom user note are supplied to the same e-mail client by the receiving email server,
   wherein said supplying further comprises including, in response to determining that a user preference indicates that said custom user note should be included in said e-mail message for said e-mail client, said custom user note as a field value of a header field of said e-mail message,
   wherein said header field comprises a field name and a field value,
   wherein said custom user note is one of a plurality of notes, and
   wherein said including comprises determining which one of said plurality of notes should be included based upon said e-mail client.

2. The method of claim 1, further comprising replacing the user supplied text of said note with different user supplied text.

3. The method of claim 1, further comprising deleting said note from the e-mail server.

4. The method of claim 1, wherein said field name of said header field comprises additional user supplied text.

5. The method of claim 1, wherein said e-mail client comprises a web browser based e-mail client.

6. The method of claim 1, wherein said associating is performed based upon information in or about said e-mail message.

7. The method of claim 1, further comprising selecting said note from a set of predefined notes based upon said e-mail client.

8. The method of claim 1, further comprising selecting said note from a set of predefined notes based upon information in or about said e-mail message.

9. The method of claim 1, wherein said e-mail client displays said note as part of summary information related to said e-mail message.

10. The method of claim 1, further comprising said e-mail client displaying said note in response to a user selection indicating said e-mail message.

11. The method of claim 1, further comprising:
    said e-mail client collecting said user supplied text from a user;
    said e-mail client generating said note from said user supplied text;
    said e-mail client supplying said note and said e-mail message to said e-mail server; and
    said e-mail client instructing said server to associate said note with said e-mail message.

12. The method of claim 11, further comprising:
    said e-mail client collecting different user supplied text from the user;
    said e-mail client supplying the different user supplied text to the e-mail server; and
    the e-mail client instructing the e-mail server to replace the user-supplied text of the note with the different user supplied text.

13. The method of claim 11, further comprising the e-mail client instructing the e-mail server to delete said note.

14. The method of claim 1, further comprising:
    searching a set of e-mail messages to locate a subset of one or more e-mail messages associated with a user specified note; and
    displaying the results of said searching to a user.

15. The method of claim 14, further comprising:
    said e-mail client sending a search request indicating said user specified note to said e-mail server;
    said e-mail server performing said searching in response to receiving said search request; and
    said e-mail server sending the results of said searching to said e-mail client.

16. The method of claim 1, further comprising:
    sorting a set of e-mail messages by their associated user notes; and
    displaying the results of said sorting to a user.

17. The method of claim 16, further comprising:
said e-mail client sending a sort request to said e-mail server;
said e-mail server performing said sorting in response to receiving said sort request; and
said e-mail server sending the results of said sorting to said e-mail client.

18. A method, comprising:
providing, by a web-browser based e-mail client, a user interface for collecting user supplied text;
generating, by the web-browser based e-mail client, a custom note from said user supplied text;
generating, by the web-browser based e-mail client, custom note information,
wherein said custom note information comprises information for identifying an e-mail message with which to link, and
wherein at the time said custom note information is generated, said custom note is not linked to said e-mail message;
sending, by the web-browser based e-mail client, said custom note and note information to an e-mail server, wherein said custom note is linked with an e-mail message on the e-mail server, wherein the e-mail server stores information identifying the e-mail message and indicating that the e-mail message is linked to said custom note, wherein said e-mail message specifies a sender and specifies a recipient of said e-mail message, wherein said recipient is distinct from said sender; and
receiving, by the web-browser based e-mail client, the e-mail message and said custom note from the e-mail server according to a user preference indicating that said custom note should be included in said e-mail message for said web-browser based e-mail client,
wherein said custom note is included as a field value of a header field of said e-mail message,
wherein said custom note is one of a plurality of notes, and
wherein which one of said plurality of notes is received is determined based upon said web-browser based e-mail client.

19. The method of claim 18, further comprising the web-browser based e-mail client replacing the user supplied text of the custom note with different user supplied text.

20. The method of claim 18, further comprising the web-browser based e-mail client deleting the custom note.

21. The method of claim 18, further comprising:
said web-browser based e-mail client storing said note; and
said web-browser based e-mail client receiving said e-mail message in a future e-mail session.

22. The method of claim 18, further comprising:
said web-browser based e-mail client supplying said custom note to said e-mail server; and
said web-browser based e-mail client supplying said custom note information to said e-mail server.

23. A device, comprising:
a processor; and
a memory coupled to said processor comprising program instructions configured to:
receive a note,
wherein said note is a custom user note comprising user supplied text;
receive, by an e-mail server, note information,
wherein said note information comprises information for identifying a received e-mail message with which to link, and
wherein at the time said note information is received, said note is not linked to said e-mail message;
receive, by said e-mail server, said e-mail message from a sender, wherein said e-mail message specifies said sender and specifies a recipient of said e-mail message, wherein said recipient is distinct from said sender;
store said note on said e-mail server;
link, on said e-mail server, said note with said e-mail message,
wherein said note and said e-mail message are linked based on said note information, and
wherein said linking comprises storing, by the e-mail server, information identifying said e-mail message and indicating that said e-mail message is linked with said note; and
subsequent to said receiving said e-mail message, supply said e-mail message and said note to an e-mail client for said recipient of said e-mail message,
wherein said e-mail message and said note are supplied to the same e-mail client,
wherein to supply said e-mail message and said note the program instructions are further configured to include, in response to determining that a user preference indicates that said note should be included in said e-mail message for said e-mail client, said note as a field value of a header field of said e-mail message,
wherein said header field comprises a field name and a field value,
wherein said note is one of a plurality of notes, and
wherein to include said e-mail message and said note the program instructions are further configured to determine which one of said plurality of notes should be included based upon said e-mail client.

24. The device of claim 23, wherein the program instructions are further configured to replace the user supplied text of the note with different user supplied text.

25. The device of claim 23, wherein the program instructions are further configured to delete said note from the e-mail server.

26. The device of claim 23, wherein said field name of said header field comprises additional user supplied text.

27. The device of claim 23, wherein said e-mail client comprises a web browser based e-mail client.

28. The device of claim 23, wherein the program instructions are further configured to perform said associating based upon information in or about said e-mail message.

29. The device of claim 23, wherein the program instructions are further configured to select said note from a set of predefined notes based upon said e-mail client.

30. The device of claim 23, wherein the program instructions are further configured to select said note from a set of predefined notes based upon information in or about said e-mail message.

31. The device of claim 23, wherein said e-mail client displays said note as part of summary information related to said e-mail message.

32. The device of claim 23, wherein said e-mail client displays said note in response to a user selection indicating said e-mail message.

33. The device of claim 23, wherein the program instructions are further configured to:
receive said note and said e-mail message from said e-mail client, wherein said e-mail client is configured to collect said user supplied text from a user and generate said note from said user supplied text; and
in response to said receiving, associate said note with said e-mail message.

34. The device of claim 33, wherein the program instructions are further configured to replace the user supplied text of the custom note with different user supplied text.

35. The device of claim 33, wherein the program instructions are further configured to delete the custom note.

36. The device of claim 23, wherein the program instructions are further configured to:
   search a set of e-mail messages to locate a subset of one or more e-mail messages associated with a user specified note; and
   display the results of said searching to a user.

37. The device of claim 36, wherein the program instructions are further configured to:
   receive a search request indicating said user specified note from said e-mail client;
   in response to said receiving a search request:
      perform said searching in response to receiving said search request; and
      send the results of said searching to said e-mail client.

38. The device of claim 23, wherein the program instructions are further configured to:
   sort a set of e-mail messages by their associated user notes; and
   display the results of said sorting to a user.

39. The device of claim 38, wherein the program instructions are further configured to:
   receive a sort request from said e-mail client; and
   in response to receiving a sort request from said e-mail client:
      perform said sorting; and
      send the results of said sorting to said e-mail client.

40. A device, comprising:
   a processor; and
   a memory coupled to said processor comprising program instructions configured to implement a web-browser based e-mail client, wherein the web-browser based e-mail client is configured to:
   provide a user interface for collecting user supplied text;
   generate a custom note from said user supplied text;
   generate custom note information,
   wherein said custom note information comprises information for identifying an e-mail message with which to link, and
   wherein at the time said custom note information is generated, said custom note is not linked to said e-mail message;
   send said custom note and said custom note information to an e-mail server, wherein said custom note is linked with an e-mail message on the e-mail server, wherein the e-mail server stores information identifying the e-mail message and indicating that the e-mail message is linked to said custom note, wherein said e-mail message specifies a sender and specifies a recipient of said e-mail message, wherein said recipient is distinct from said sender; and
   receive, by the web-browser based e-mail client, the e-mail message and said custom note from the e-mail server according to a user preference indicating that said custom note should be included in said e-mail message for said web-browser based e-mail client,
   wherein said custom note is included as a field value of a header field of said e-mail message,
   wherein said custom note is one of a plurality of notes, and
   wherein which one of said plurality of notes is received is determined based upon said web-browser based e-mail client.

41. The device of claim 40, wherein the web-browser based e-mail client is further configured to replace the user supplied text of the custom note with different user supplied text.

42. The device of claim 40, wherein the web-browser based e-mail client is further configured to delete the custom note.

43. The device of claim 40, wherein the web-browser based e-mail client is further configured to:
   store said note; and
   receive said e-mail message in a future e-mail session.

44. The device of claim 40, wherein the web-browser based e-mail client is further configured to:
   supply said custom note to said e-mail server; and
   supply said custom note information to said e-mail server.

45. A non-transitory computer accessible medium comprising program instructions, wherein the program instructions are configured to implement:
   receiving a note,
   wherein said note is a custom user note comprising user supplied text;
   receiving, by an e-mail server, note information,
   wherein said note information comprises information for identifying a received e-mail message with which to link, and
   wherein at the time said note information is received, said note is not linked to said e-mail message;
   receiving, by said e-mail server, said e-mail message from a sender, wherein said e-mail message specifies said sender and specifies a recipient of said e-mail message, wherein said recipient is distinct from said sender;
   storing said note on said e-mail server;
   linking, by said e-mail server, said note with said e-mail message,
   wherein said note and said e-mail message are linked based on said note information,
   wherein said linking comprises, storing, by said e-mail server, information identifying said e-mail message and indicating that said e-mail message is linked with said note; and
   subsequent to said receiving said e-mail message, supplying said e-mail message and said note to an e-mail client for said recipient of said e-mail message, wherein said e-mail message and said note are supplied to the same e-mail client,
   wherein said supplying further comprises including, in response to determining that a user preference indicates that said note should be included in said e-mail message for said e-mail client, said note as a field value of a header field of said e-mail message,
   wherein said note is one of a plurality of notes, and
   wherein said including comprises determining which one of said plurality of notes should be included based upon said e-mail client.

46. The computer accessible medium of claim 45, wherein the program instructions are further configured to implement replacing the user supplied text of the note with different user supplied text.

47. The computer accessible medium of claim 45, wherein the program instructions are further configured to implement deleting the note.

48. The computer accessible medium of claim 45, wherein said field name of said header field comprises additional user supplied text.

49. The computer accessible medium of claim 45, wherein said e-mail client comprises a web browser based e-mail client.

50. The computer accessible medium of claim 45, wherein said associating is performed based upon information in or about said e-mail message.

51. The computer accessible medium of claim 45, wherein the program instructions are further configured to implement selecting said note from a set of predefined notes based upon said e-mail client.

52. The computer accessible medium of claim 45, selecting said note from a set of predefined notes based upon information in or about said e-mail message.

53. The computer accessible medium of claim 45, wherein the program instructions are further configured to implement said e-mail client displaying said note as part of summary information related to said e-mail message.

54. The computer accessible medium of claim 45, wherein the program instructions are further configured to implement said e-mail client displaying said note in response to a user selection indicating said e-mail message.

55. The computer accessible medium of claim 45, wherein the program instructions are further configured to implement:
 receiving said note and said e-mail message from said e-mail client, wherein said e-mail client is configured to implement:
  collecting said user supplied text from a user;
  generating said note from said user supplied text; and
 associating said note with said e-mail message in response to receiving said note and said e-mail message.

56. The device of claim 55, wherein the program instructions are further configured to implement replacing the user supplied text of the note with different user supplied text.

57. The device of claim 55, wherein the program instructions are further configured to implement deleting the custom note.

58. The computer accessible medium of claim 45, wherein the program instructions are further configured to implement:
 searching a set of e-mail messages to locate a subset of one or more e-mail messages associated with a user specified note; and
 displaying the results of said searching to a user.

59. The computer accessible medium of claim 58, wherein the program instructions are further configured to implement:
 receiving a search request from an e-mail client indicating said user specified note to said e-mail server;
 performing said searching in response to receiving said search request; and
 sending the results of said searching to said e-mail client.

60. The computer accessible medium of claim 45, wherein the program instructions are further configured to implement:
 sorting a set of e-mail messages by their associated user notes; and
 displaying the results of said sorting to a user.

61. The computer accessible medium of claim 60, wherein the program instructions are further configured to implement:
 receiving a sort request from said e-mail client;
 performing said sorting in response to receiving said sort request; and
 sending the results of said sorting to said e-mail client.

62. A non-transitory computer accessible medium comprising program instructions, wherein the program instructions are configured to implement a web-browser based e-mail client, wherein the web-browser based e-mail client is configured to implement:
 providing a user interface for collecting user supplied text;
 generating a custom note from said user supplied text;
 generating custom note information,
  wherein said custom note information comprises information for identifying an e-mail message with which to link, and
  wherein at the time said custom note information is generated, said custom note is not linked to said e-mail message;
 sending said custom note and said custom not information to an e-mail server,
  wherein said custom note is linked with an e-mail message on the e-mail server, wherein the e-mail server stores information identifying the e-mail message and indicating that the e-mail message is linked to said custom note, wherein said e-mail message specifies a sender and specifies a recipient of said e-mail message, wherein said recipient is distinct from said sender; and
 receiving, by the web-browser based e-mail client, said e-mail message and said custom note from the e-mail server according to a user preference indicating that said custom note should be included in said e-mail message for said web-browser based e-mail client,
  wherein said custom note is included as a field value of a header field of said e-mail message,
  wherein said custom note is one of a plurality of notes, and
  wherein which one of said plurality of notes is received is determined based upon said web-browser based e-mail client.

63. The computer accessible medium of claim 62, wherein the web-browser based e-mail client is further configured to implement replacing the user supplied text of the custom note with different user supplied text.

64. The computer accessible medium of claim 62, wherein the web-browser based e-mail client is further configured to implement deleting the custom note.

65. The computer accessible medium of claim 62, wherein the web-browser based e-mail client is further configured to implement:
 storing said note; and
 receiving said e-mail message in a future e-mail session.

66. The computer accessible medium of claim 62, wherein the web-browser based e-mail client is further configured to implement:
 supplying said custom note to e-mail server; and
 supplying said custom note information to said e-mail server.

* * * * *

UNITED STATES PATENT AND TRADEMARK OFFICE
CERTIFICATE OF CORRECTION

| | |
|---|---|
| PATENT NO. | : 8,788,592 B1 |
| APPLICATION NO. | : 10/824735 |
| DATED | : July 22, 2014 |
| INVENTOR(S) | : Mutreja |

It is certified that error appears in the above-identified patent and that said Letters Patent is hereby corrected as shown below:

In the Claims,

In column 20, line 20, in Claim 62, delete "not" and insert -- note --, therefor.

Signed and Sealed this
Third Day of March, 2015

Michelle K. Lee
*Deputy Director of the United States Patent and Trademark Office*